July 10, 1923.

R. V. NEWSHAM

COMBINATION BILLING SYSTEM

Filed June 29, 1922

1,461,399

2 Sheets-Sheet 1

Inventor
R. V. Newsham
By
Attorneys.

July 10, 1923.
R. V. NEWSHAM
COMBINATION BILLING SYSTEM
Filed June 29, 1922.
1,461,399
2 Sheets-Sheet 2
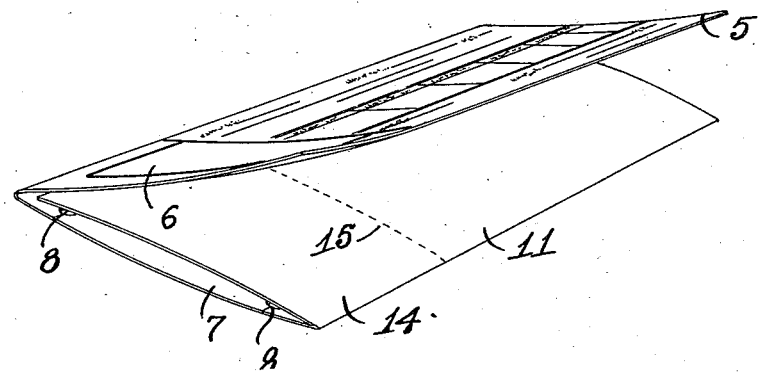
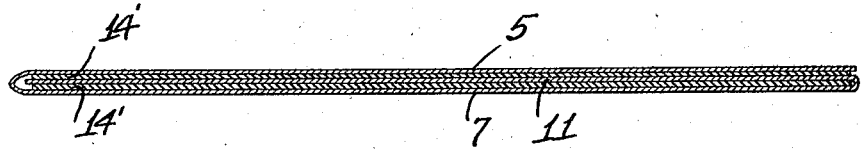
Inventor
R. V. Newsham
By
Attorneys.

Patented July 10, 1923.

1,461,399

UNITED STATES PATENT OFFICE.

ROY V. NEWSHAM, OF OAKLAND, CALIFORNIA.

COMBINATION BILLING SYSTEM.

Application filed June 29, 1922. Serial No. 571,594.

*To all whom it may concern:*

Be it known that I, ROY V. NEWSHAM, a citizen of the United States, and a resident of Oakland, county of Alameda, and State of California, have invented a new and useful Combination Billing System, of which the following is a specification.

My invention relates in general to billing systems and like records and has reference more particularly to a combination form which will enable an office transaction to be accounted for in one operation on a typewriter to leave the original bill a so-called expiration record and a copy of the original bill for collection purposes.

Owing to the well thought out arrangement of the bill the same may be used with every degree of satisfaction and convenience for several different specific purposes without departing from the underlying principle of the same and the following description should be considered in this light.

The preferred form of the bill is shown in the accompanying drawings in which Figure 1 is a view in plan of one face of the bill before folding; Figure 2 is a similar view of the opposite side of the bill; Figure 3 is a perspective view of the bill as folded and Figure 4 is a longitudinal cross-section through the bill as folded and showing carbon sheets introduced between the folds. The results obtained by the use of this improved bill represent maximum efficiency, saving of time, labor and material, improved collection results, reduced operating costs and consequently increased profits.

To more clearly understand the function of the bill reference will now be made to the drawings in detail, for instance, in Figure 1 (5) represents the original bill sheet which consists of a printed form, lined and crosslined in spaces to clearly show the business transaction so that it will be easily understood and with a blocked off space to the left shown as at (6) leaving sufficient space for advertising purposes, such for instance, as the name of the company or individual transacting the business, for instance, the agent's name and with printing indicating his particular kind of business and address.

The bill copy sheet indicated at (7) is punched and slotted as at (8) for filing purposes. The sheet on one face is numbered along the bottom as at (9) with the numbers 1 to 31 representing the days in the longest calendar month and these numbers become an automatic collection diary by using spring signalling markers or other appropriate devices to indicate the day payment has been promised or other collection action on any particular bill. Each day's bill that comes up for attention can be quickly referred to as the signals will appear in a vertical line under each day of the month. These signals are not shown but are merely referred to to give a clear understanding of the utility of the sheet. Along side of the numbers 1 to 31 is a blocked off space (10) for reference purposes concerning entries that have been made from the charges indicated on the bill.

The sheet (11) indicates the expiration record which is a carbon reproduction of all entries on the original bill sheet (5) with the entry on the expiration record adapted to be filed by month and year. Extra copies can be made by inserting additional blank sheets and carbon sheets at the time the bill is being made up.

In utilizing the combination bill, the sheets shown in Figures 1 and 2 are folded along the dotted lines (12) and (13) (see, for instance, Figures 3 and 4), and carbon sheets (14') are inserted between the folds so that the folded sheets may be put into a typewriter and filled out according to requirements. When the bill has been made up the original of course, is forwarded to the client by being separated along the perforations shown by the dotted lines (12) leaving the sheets (7) and (11) which may be separated along the perforation shown by the dotted line (13) and filed in their respective places. For instance the bill copy may be filed in a suitable binder indexed A to Z. This bill copy includes a carbon of every item on the original and when filed away leaves a complete record for reference. The expiration record includes also a complete copy of the bill and may be filed for reference by the month and year so that it becomes an automatic call up system at the expiration of a set time from the date of the original bill. If necessary the length of the expiration record or rather the sheet (11) may be reduced by separating the end (14) along the dotted line (15). At one end of the bill copy sheet (7) on the same face as that of the numbers 1 to 31 is a space (16) marked off as a collection memorandum.

Attention is again called to the fact that changes in the printing and specific arrangement of the ruled lines, et cetera, may be made to accommodate the bill to various business methods without departing from the spirit of the invention as defined by the subjoined claim.

I claim:

A combination bill system comprising in combination, a bill sheet adapted to be folded and written upon to leave an original and two carbon copies of a business transaction, the original and carbon copies adapted to be detached after the transaction has been written, to serve as complete and separate records of the business transaction as written, one of the carbon copies including a collection diary for reference purposes embodying numbers printed in numerical order along the edge of the sheet and corresponding to the days in a calendar month, and also line spaced to serve as a bookkeeping reference.

ROY V. NEWSHAM.